Patented Nov. 11, 1947

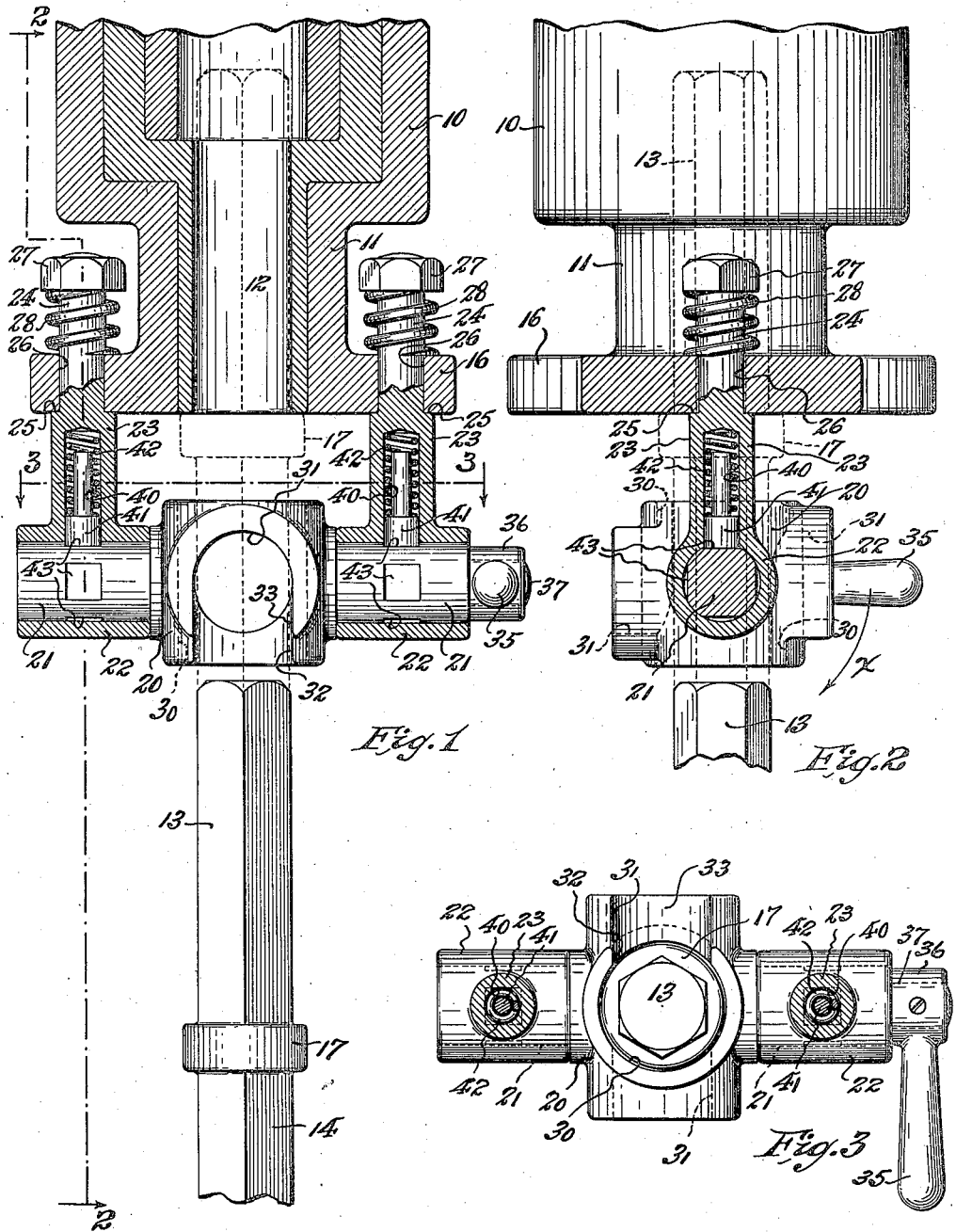

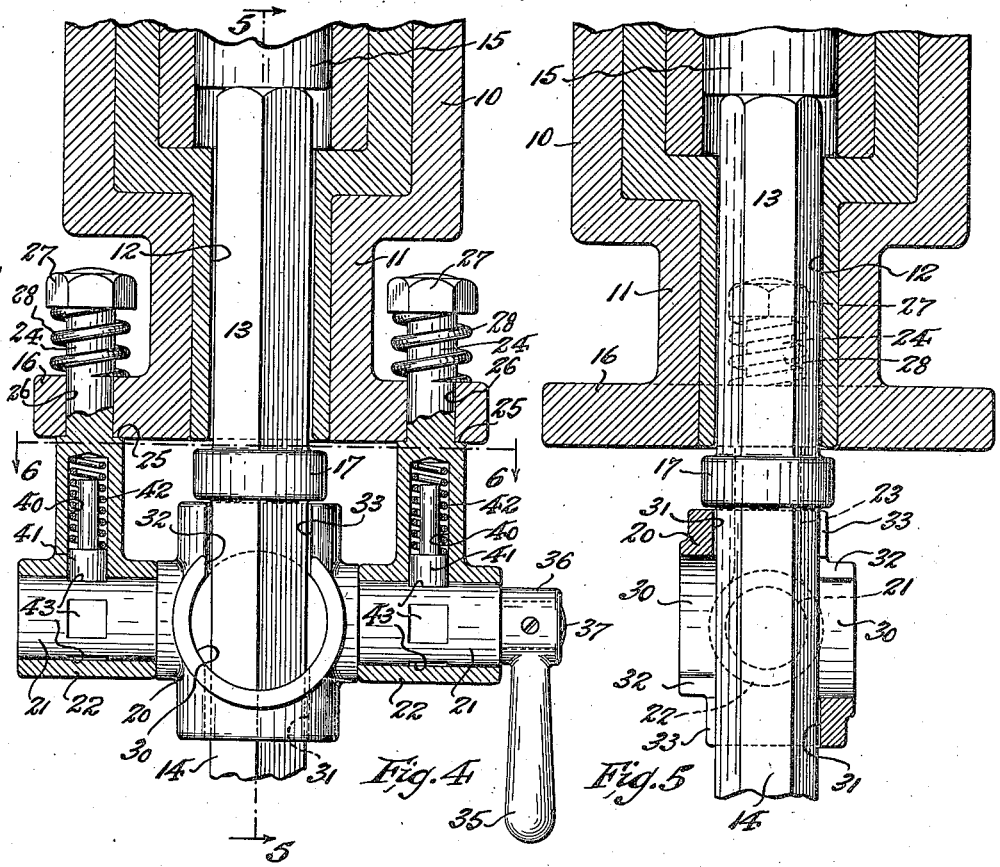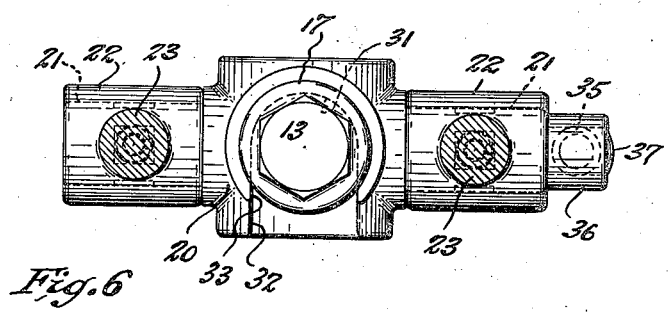

2,430,716

UNITED STATES PATENT OFFICE 2,430,716

TOOL RETAINER AND ALIGNER FOR PERCUSSIVE APPARATUS

Charles A. Hirschberg, Mountain Lakes, N. J.,

Application September 8, 1944, Serial No. 553,164

8 Claims. (Cl. 279—19.1)

This invention relates to improvements in percussive apparatus such as rock drills, pneumatic hammers, and like impact mechanisms; and the invention has reference, more particularly, to improved means for retaining and aligning collared drill steel or similar detachable tools in operative coupled relation to such percussive apparatus.

This invention has for an object to provide the drill steel or like tool receiving end of percussive apparatus with novel manipulatable means for releasably coupling a collared drill steel or like tool in operative aligned relation thereto, whereby to prevent escape of said drill steel or like tool therefrom when the apparatus is moved about or withdrawn from the work, but nevertheless leaving the coupled drill steel or like tool free for axial play or rotatable shift, or both, while the same is actuated by operation of the apparatus.

The invention has for a further object to provide a novel retainer and aligner for the purposes stated comprising rotatable coupler means and means for supporting the same in connection with the drill steel or like tool receiving end of percussive apparatus; said coupler means comprising a rotatable coupler body having right angularly intersecting passages, one of which is sized diametrically to permit passage therethrough of the collar of a drill steel or like tool, while the other is of relatively reduced diameter, sized to embrace the drill steel or like tool when aligned therewith, but being too small to admit axial passage therethrough of the collar of the latter; said coupler body being provided with side openings or lateral ways communicating with angularly adjoined free end portions of said intersecting passages and with each other, whereby to permit rotation of said coupler body about an inserted drill steel or like tool to selectively dispose one or the other of said passages in axial alignment with the inserted drill steel or like tool.

Another object of the invention is to provide a novel means for yieldably suspending the rotatable coupler body in operative attached and aligned relation to the drill steel or like tool receiving end of percussive apparatus; and still another object is to provide novel detent means cooperative with the rotatable coupler body for yieldably holding the same, optionally, in either retaining or releasing relation to an inserted drill steel or like tool.

The invention has for a further object to provide a form of rotatable coupler body which is provided with identical opposite end structures, whereby the body is reversible relative to its holding relation to a collared drill steel or like tool; in other words, whereby either one or the other of said end structures may be operatively positioned for holding the drill steel or like tool in coupled relation to a percussive apparatus; all whereby the useful life of the coupler body is substantially prolonged.

Other objects of the invention, not at this time more particularly enumerated, will be understood from the following detailed description of the same.

An illustrative embodiment of this invention is shown in the accompanying drawings, in which—

Fig. 1 is a fragmentary sectional view of the drill steel or like tool receiving end of a percussive apparatus equipped with the novel coupling means of this invention, the latter being shown in position to permit passage of a collared drill steel therethrough to operative engaged connection with the apparatus; Fig. 2 is a longitudinal sectional view of the same taken on line 2—2 in Fig. 1; Fig. 3 is a horizontal sectional view taken on line 3—3 in Fig. 1; Fig. 4 is a view similar to that of Fig. 1, but showing the coupler means rotated to a position for retaining and aligning the collared drill steel in operative connected engagement with the percussive apparatus; Fig. 5 is a longitudinal vertical sectional view taken on line 5—5 in Fig. 4; and Fig. 6 is a horizontal sectional view taken on line 6—6 in Fig. 4.

Similar characters of reference are employed in the above-described views to indicate corresponding parts.

Referring to the drawings, the reference character 10 indicates the cylinder or casing of a percussive apparatus, which may be of any type known to the art. Said cylinder or casing 10 terminates at its lower or tool receiving end in a suitably shaped throat member 11 having an axial passage 12 to receive the shank end portion 13 of a drill steel or like tool 14 for operative connection thereof with the apparatus, subject to the impact of blows produced by a reciprocated striking member 15 contained within the cylinder or casing 10. Preferably said throat member 11 is provided at its free end with a laterally extending annular flange 16.

The novel means, according to this invention, for retaining and aligning the drill steel 14 in operaitve coupled relation to the cylinder or casing 10 of the percussive apparatus, is especially designed for use with collared or lugged drill steel or like tools, i. e., one the shank 13 of which is provided, in suitably downwardly spaced relation to its impact receiving end, with diametrically enlarged, laterally projecting collar or lug portions; such e. g. as the collar 17 with which the drill steel 14 is provided, as shown in the drawings.

An illustrative embodiment of the novel drill steel retainer and aligner, as shown, comprises a preferably cruciform coupler body 20 having lateral trunnion members 21 aligned with the central transverse axis thereof, and respectively extending outwardly from opposite sides thereof, whereby said coupler body 20 is adapted to be rotated about said transverse axis. The means for supporting said coupler body, subject to such rotation, comprises hanger bearings 22 in which said trunnion members are journaled. Said hanger bearings are provided with hanger arms 23, preferably integral therewith, and disposed to extend angularly from sides thereof. Said hanger arms 23 terminate in extensions 24 of reduced diameter, whereby to provide stop shoulders 25 between said arms and extensions. Said extensions are adapted to slidably engage through openings 26 with which the flange 16 of the cylinder or casing throat member of the percussive apparatus is provided. Fixed on the free ends of said extensions 24 are stop nuts 27 or the like, and mounted around said extensions, between said flange 16 and stop nuts 27, are compression springs 28. Said compression springs 28 exert yieldable upward thrust upon the extensions 24 and hanger arms 23, whereby to normally dispose the shoulders 25 of the latter in stopped abutment against the underside of said flange 16, thus disposing the bearings 22 and coupler body 20 carried thereby in normal supported relation to the cylinder or casing throat member 11, and yet yieldable to impact induced downward movement of a drill steel 14 which is operatively engaged by said coupler body.

The coupler body 20 is provided with right angularly intersecting passages disposed in planes intersecting the transverse axis of rotation thereof. One said passage, indicated by the reference character 30, is diametrically sized somewhat in excess of the diameter of the drill steel collar 17, whereby to permit passage of said collar 17 therethrough when the shank and body of the drill steel is axially aligned therewith for movement therethrough, and thence into the passage 12 of the cylinder or casing throat member 11, so as to be assembled in operative relation to the percussive apparatus. The other said passage, indicated by the reference character 31, is of smaller diameter, being sized to embrace the drill steel 14, but being of less diameter than that of the drill steel collar 17, whereby the latter may be stopped against the coupler body 20, so as to retain the drill steel 14 against undesired withdrawal or escape from operative assembled relation to the percussive apparatus. Angularly adjoining end portions of the coupler body 20, in the preferred cruciform body shape, are provided, in proximate or mutually opposed sides thereof, respectively, with side openings or lateral ways which open out respectively from the sides of the respective passages 30 and 31; conterminous inner ends of said side openings or ways being in communication, and said openings or ways being endwise open at the extremities of said angularly adjoining end portions of the coupler body. The side openings or ways which open outwardly from end portions of the wider passage 30, respectively in opposite directions, are indicated by the reference character 32, and the side openings or ways which open outwardly from the end portions of the narrower passage 31, respectively in opposite directions, are indicated by the reference character 33. Said side openings or ways 32 and 33 are of a width somewhat in excess of the diameter of the drill steel 14, whereby to permit passage to the latter laterally therethrough, when the coupler body is rotated in selected direction to bring either the one or the other of the passages 30 or 31 into axial alignment with a drill steel 14 engaged by the coupler body.

To dispose the coupler body 20 in position to permit a collared drill steel to be passed therethrough into operative assembled relation to the percussive apparatus, said coupler body is rotated on its trunnions 21 to bring its wider passage 30 into axial alignment with the passage 12 of the cylinder or casing throat member 11 (see Figs. 1, 2 and 3). When the coupler body 20 is thus disposed, the shank 13 and collar 17 of the drill steel 14 may be inserted into and passed through the passage 30, until said shank 13 is operatively engaged in the cylinder or casing throat member 11, and the collar 17 is positioned above the coupler body and between the latter and the end of the throat member 11 (as shown by broken line representation in Figs. 1 and 2).

After the drill steel is thus passed through the coupler body 2 into operative assembled relation to the percussive apparatus, said coupler body is rotated clockwise (or in direction of the arrow $x$ in Fig. 2) a quarter turn or ninety degrees about its transverse axis. During such rotation, movement of the endwise conterminous side openings or ways 32 and 33 relative to the drill steel 14 occurs, whereby, in effect, the latter passes outwardly through the side openings or ways 32 and thence inwardly through the side openings or ways 33, until, at the end of the quarter turn rotative movement of the coupler body, said drill steel 14 enters and is aligned with the narrower passage 31 so as to be embraced thereby. Since said narrower passage 31 is too small to admit movement therethrough of the drill steel collar 17, which now lies above the coupler body, an end portion of the latter will be opposed to said collar 17, whereby to arrest downward movement thereof, and consequently so as to prevent undesired withdrawal or escape of the drill steel from operative assembled relation to the percussive apparatus (see Figs. 4, 5 and 6).

When it is desired to release the drill steel 14 for disconnection from the percussive apparatus, the coupler body 20 is reversely rotated to again bring the wider passage 30 thereof into alignment with the drill steel collar 17, so that the latter may be withdrawn therethrough, and thus removed from the percussive apparatus.

While not essential, it may be desirable to provide a finger piece or handle to facilitate manipulation of the coupler body. One convenient arrangement of finger piece or handle is shown in the drawings by way of illustration, the same comprising a hand lever 35, the hub 36 of which is affixed to an axial extension 37 with which a trunnion 21 of the coupler body is provided.

It is desirable to provide detent means operative to yieldably hold the coupler body 20 in any selectively adjusted position to which it may have been moved, whereby to optionally dispose the same in any given drill steel retaining or drill steel releasing position. A preferred form and arrangement of detent means for this purpose, as shown, comprises the provision, within one or both hanger arms 23 of the hanger bearings 24, of a chamber 40 having an open end toward the interior of the adjacent hanger bearing. Slidably movable in said chamber 40 is a detent plunger 41, which is yieldably urged by a compression spring 42, mounted within the chamber 40 behind the same, toward a trunnion 21 journaled in said hanger bearing. Said trunnion 21 is provided with flat detent seats or faces 43 adapted to be selectively engaged by said detent plunger 41. Said detent seats or faces correspond in number and positions to given drill steel retaining and releasing positions in which the coupler body 20 may be selectively disposed, whereby when a given detent seat or face is engaged by the detent plunger 41, the trunnion 21 provided therewith, and consequently the coupler body, will be yieldably held against displacement from a given position determined by or corresponding to that of the engaged detent seat or face.

It will be understood that the coupler body 20 is so spaced relative to the drill steel receiving end of the percussive apparatus, that ample room is allowed for axial play of the drill steel collar 17 when the drill steel is moved under impact and impact reaction by operation of said percussive apparatus. If, by chance, the drill steel collar 17, under impact induced downward movement of the drill steel, should be carried into contact with the coupler body 20, the latter will yield to the impact thereof, by reason of the yieldable suspension of the same by the hanger bearings 22, so that any shock of such impact is absorbed by the compression springs 28 by which the hanger arms 23 of said hanger bearings are supported.

By the preferred cruciform shape of the coupler body 20, the latter is provided with identical opposite end structures, whereby either end may, by rotation of the coupler body, be selectively brought into opposed relation to the drill steel receiving end of the percussive apparatus at will, and thus into service relation to a drill steel desired to be held in operative assembled relation to the apparatus. By reason of this, the useful life of the coupler body is doubled.

It is realized that various changes could be made in the above-described constructions without departing from the scope of this invention as defined by the following claims. It is therefore intended that all matter contained in the foregoing description or shown in the accompanying drawings shall be interpreted as illustrative and not in a limiting sense.

I claim:

1. In combination with percussive apparatus and a collared tool adapted to be actuated thereby, means to releasably retain and align the tool in operative connected relation to said apparatus, comprising a rotatable coupler body having trunnions extending from opposite sides thereof, hanger means for said trunnions dependent from the tool receiving end of the apparatus adapted to suspend said coupler body in axially aligned spaced relation to and below the latter, said coupler body having through passages at right angles one to the other and intersecting at the axis of rotation of said body, one of said passages being of cross-sectional area large enough to pass the tool and its collar therethrough, the other of said passages being of cross-sectional area adapted to embrace the tool body but less than that of the tool collar, and said coupler body having, at diagonally opposite portions thereof, endwise open side openings respectively communicating with said body passages and with each other, whereby to permit rotation of said coupler body about a tool extending therethrough to selectively dispose one or the other of said passages in axial alignment with said tool.

2. In combination with percussive apparatus and a collared tool adapted to be actuated thereby, means to releasably retain and align the tool in operative connected relation to said apparatus, comprising a rotatable coupler body having trunnions extending from opposite sides thereof, hanger means for said trunnions dependent from the tool receiving end of the apparatus adapted to suspend said coupler body in axially aligned spaced relation to and below the latter, said coupler body having through passages at right angles one to the other and intersecting at the axis of rotation of said body, one of said passages being of cross-sectional area large enough to pass the tool and its collar therethrough, the other of said passages being of cross-sectional area adapted to embrace the tool body but less than that of the tool collar, said coupler body having, at diagonally opposite portions thereof, endwise open side openings respectively communicating with said body passages and with each other, whereby to permit rotation of said coupler body about a tool extending therethrough to selectively dispose one or the other of said passages in axial alignment with said tool, and means to hold said coupler body in selected adjusted position relative to a tool extending therethrough.

3. In combination with percussive apparatus and a collared tool adapted to be actuated thereby, means to releasably retain and align the tool in operative connected relation to said apparatus, comprising a rotatable coupler body having trunnions extending from opposite sides thereof, hanger means for said trunnions dependent from the tool receiving end of the apparatus adapted to suspend said coupler body in axially aligned spaced relation to and below the latter, said coupler body having through passages at right angles one to the other and intersecting at the axis of rotation of said body, one of said passages being of cross-sectional area large enough to pass the tool and its collar therethrough, the other of said passages being of cross-sectional area adapted to embrace the tool body but less than that of the tool collar, said coupler body having at diagonally opposite positions thereof, endwise open side openings respectively communicating with said body passages and with each other, whereby to permit rotation of said coupler body about a tool extending therethrough to selectively dispose one or the other of said passages in axial alignment with said tool, and automatic yieldable detent means to hold said coupler body in selected adjusted position relative to a tool extending therethrough.

4. In combination with percussive apparatus and a collared tool adapted to be actuated thereby, means to releasably retain and align the tool in operative connected relation to said apparatus, comprising a rotatable coupler body having trunnions extending from opposite sides thereof, hanger means for said trunnions dependent from the tool receiving end of the apparatus adapted to suspend said coupler body in axially aligned spaced relation to and below the latter, means to yieldably support said hanger bearings and the coupler body carried thereby against down thrusting impacts, said coupler body having through passages at right angles one to the other and intersecting at the axis of rotation of said body, one of said passages being of cross-sectional area large enough to pass the tool and its collar therethrough, the other of said passages being of cross-sectional area adapted to embrace the tool body but less than that of the tool collar, and said coupler body having, at diagonally opposite portions thereof, endwise open side openings respectively communicating with said body passages and with each other, whereby to permit rotation of said coupler body about a tool extending therethrough to selectively dispose one or the other of said passages in axial alignment with said tool.

5. In combination with percussive apparatus and a collared tool adapted to be actuated thereby, means to releasably retain and align the tool in operative connected relation to said apparatus, comprising a rotatable coupler body having trunnions extending from opposite sides thereof, hanger means for said trunnions dependent from the tool receiving end of the apparatus adapted to suspend said coupler body in axially aligned spaced relation to and below the latter, means to yieldably support said hanger bearings and the coupler body carried thereby against down thrusting impacts, said coupler body having through passages at right angles one to the other and intersecting at the axis of rotation of said body, one of said passages being of cross-sectional area large enough to pass the tool and its collar therethrough, the other of said passages being of cross-sectional area adapted to embrace the tool body but less than that of the tool collar, said coupler body having, at diagonally opposite portions thereof, endwise open side openings respectively communicating with said body passages and with each other, whereby to permit rotation of said coupler body about a tool extending therethrough to selectively dispose one or the other of said passages in axial alignment with said tool, and means to hold said coupler body in selected adjusted position relative to a tool extending therethrough.

6. In combination with percussive apparatus and a collared tool adapted to be actuated thereby, means to releasably retain and align the tool in operative connected relation to said apparatus, comprising a rotatable coupler body having trunnions extending from opposite sides thereof, hanger means for said trunnions dependent from the tool receiving end of the apparatus adapted to suspend said coupler body in axially aligned spaced relation to and below the latter, means to yieldably support said hanger bearings and the coupler body carried thereby against down thrusting impacts, said coupler body having through passages at right angles one to the other and intersecting at the axis of rotation of said body, one of said passages being of cross-sectional area large enough to pass the tool and its collar therethrough, the other of said passages being of cross-sectional area adapted to embrace the tool body but less than that of the tool collar, said coupler body having, at diagonally opposite portions thereof, endwise open side openings respectively communicating with said body passages and with each other, whereby to permit rotation of said coupler body about a tool extending therethrough to selectively dispose one or the other of said passages in axial alignment with said tool, and automatic yieldable detent means to hold said coupler body in selected adjusted position relative to a tool extending therethrough.

7. Means for releasably retaining and aligning a collared working tool in operative assembled relation to a percussive apparatus, comprising a cruciform coupler body, means to rotatably support said coupler body for rotation about its transverse axis adjacent to the tool receiving end of said apparatus, the crossed arms of said coupler body each having axial passages therethrough, the passage of one arm being of diametric size adapted to permit movement therethrough of the tool and its collar, the passage of the other arm being of diametric size adapted to embrace the tool body but being too small to permit movement therethrough of the tool collar, angularly adjoining free end portions of said crossed arms at one end of said coupler body having interconnected endwise open ways leading laterally outward from the coupler body passages in one direction, and angularly adjoining free end portions of said crossed arms at the opposite end of said coupler body having like interconnected endwise open ways leading laterally outward from the coupler body passages in the opposite direction, said ways being of sufficient width to straddle a tool body, whereby to permit rotation of said coupler body about its transverse axis relative to a tool extending therethrough to selectively dispose one or the other of said coupler body passages in axial alignment with said tool.

8. Means for releasably retaining and aligning a collared working tool in operative assembled relation to a percussive apparatus as defined in claim 7, including yieldable detent means adapted to hold said coupler body in selected adjusted position relative to a tool extending therethrough.

CHARLES A. HIRSCHBERG.

REFERENCES CITED

The following references are of record in the file of this patent:

UNITED STATES PATENTS

| Number | Name | Date |
|---|---|---|
| 1,229,424 | Edwards | June 12, 1917 |
| 1,666,425 | Mock | Apr. 17, 1928 |
| 1,986,297 | Smith | Jan. 1, 1935 |